United States Patent [19]
Maginnis

[11] Patent Number: 5,292,794
[45] Date of Patent: Mar. 8, 1994

[54] REMOVABLE PROTECTIVE COATING COMPOSITION FOR SPRAY PAINTING AREAS

[75] Inventor: Michael A. Maginnis, Dover, N.J.

[73] Assignee: AlliedSignal Inc., Morristown, N.J.

[21] Appl. No.: 724,002

[22] Filed: Jul. 1, 1991

[51] Int. Cl.$^5$ ................................................ C08F 8/42
[52] U.S. Cl. ................................ 524/556; 525/330.2; 525/367; 525/368; 525/369; 525/371; 525/372; 525/373
[58] Field of Search ...................... 524/556; 525/330.2

[56] References Cited

U.S. PATENT DOCUMENTS

| | | | |
|---|---|---|---|
| 3,404,134 | 10/1968 | Rees | 525/368 |
| 3,472,825 | 10/1969 | Walter et al. | 525/330.2 |
| 4,324,872 | 4/1982 | Lakshmanan | 525/330.2 |

FOREIGN PATENT DOCUMENTS

| | | |
|---|---|---|
| 0201702 | 3/1986 | European Pat. Off. |
| 0333146 | 3/1989 | European Pat. Off. |
| 2023759 | 9/1969 | France |

Primary Examiner—Bernard Lipman
Attorney, Agent, or Firm—Melanie L. Brown; Roger H. Criss

[57] ABSTRACT

A water washable protective coating composition for application to surfaces subjected to contact with airborne paints which composition comprises an ionomer of a copolymer of an acrylic acid and an alpha-olefin. The composition forms a protective, clear low-slip coating layer upon surfaces, and is readily removable with heated water.

14 Claims, No Drawings

REMOVABLE PROTECTIVE COATING COMPOSITION FOR SPRAY PAINTING AREAS

BACKGROUND

1. Field of the Invention

The invention relates to protective coating compositions for application to surfaces subject to contact with airborne paints wherein said composition is washable from the surfaces and is used to protect the surfaces from contact with the airborne paint. 2. Description of the Prior Art The manufacture of many articles requires the application of a spray coating of a paint upon exposed surfaces. Typically, such articles include consumer and industrial articles such as automobiles, automobile panels and parts, appliances, machinery, and the like.

For the application of the sprayed paint to such articles, it is well known to the art to use a "spray booth". Generally, a spray booth comprises a sealable chamber which is large enough to hold the article upon which the sprayed paint is to be applied. The article is placed therein, the chamber closed and then by means by human operators operating pressurized spray guns and/or through the use of robotic operators operating spray guns or spray nozzles, a desired coat of paint may be applied to the exposed surfaces of the article. The spray booth functions to retain any sprayed paint which may be "oversprayed" and does not adhere to the article, which oversprayed paint is entrained in the air, thus becoming "airborne", within the spray booth and which may ultimately deposit upon a surface within the spray booth other than the surface of the article. The spray booth may be seen to act as an isolation chamber isolating the air within the spray booth from the exterior environment.

One shortcoming in the use of spray booths is that due to the nature of the spray painting operations carried therein, it is very difficult to control or to limit the surfaces upon which the sprayed paint may ultimately come to rest. As such, the paint which is desirably sprayed only upon the article is deposited not only on the article being sprayed, but also upon any exposed surface within the sprayed booth. Such surfaces include the walls, ceiling, any gratings, the operators themselves, and any equipment or apparatus within the spray booth. This is highly undesirable as during possible subsequent applications of different types of sprays or different colors of sprays, there was a risk of contamination from a prior applied sprayed paint, and as such a possible distraction from the appearance of the article being painted. Further, consequent to the fact that many paints which are used in such spray painting operation contain volatile organics their possible health risk to human operators who operate within the confines of the spray booth, it is desirable to maintain cleanliness within the spray booth particularly of paint deposited upon surfaces in the spray booth and thereby limit the exposure of human operators to these volatile organics.

Various methods are presently known to the art for limiting the retention of over sprayed paint within the spray booth. One such method referred to as a "water curtain" method finds us in protecting the vertical walls of the spray booth. In such a method, a thin laminar film of water constantly flows from the top edge and the bottom edge of the spray booth walls; thereby, limiting the contact of any entrained paint in the air with the wall surfaces. While this method is known and highly effective in limiting the deposition of the wall surfaces, it nonetheless limited only to wall surfaces and cannot be used for example upon the ceilings, floors, or in covering the equipment and apparatus contained within the spray booth.

Coating compositions comprising acrylics which are used to coat surfaces within the spray booth prior to the application of a sprayed paint to an article are also known to the art. One such acrylic is a pigmented acrylic which may be applied to exposed surfaces which are desirably protected. The pigmented acrylic provides an effective coating against entrained paint, however, it itself is not readily removable from the surfaces upon which it is applied. A further acrylic coating known to the art is a clear acrylic coating composition which may, in a similar manner to the pigmented acrylic noted, may be applied to surfaces within the spray booth. The clear acrylic provides the benefit of non-discoloration of the surfaces within the spray booth. However, is slippery and is known to have poor resistance to a wide variety of organic solvents which find common use as constituents in spray painting compositions. Both of these acrylic containing compounds are also known to comprise a proportion of volatile organic constituents, which, while effective in forming these acrylic comprising compositions also provide a further supplemental health hazard to human operators operating within the spray booth.

Therefore, it is apparent that there is a continuing need in the art for further improved compositions for protective coatings which may be readily applied to surfaces which are subject to contact with airborne paints, wherein such coating composition is readily washable, has little or no volatile organics within its composition, and which does not discolor the surfaces upon which it is applied.

SUMMARY OF THE INVENTION

In one aspect, the present invention provides a washable protective coating composition for application to surfaces subjected to contact with airborne paints and other coating materials, such as clear finishing coating materials, which composition comprises an ionomer of a copolymer of an acrylic acid and an alpha-olefin.

In a further aspect of the invention, there is provided a washable protective coating composition for application to surfaces subjected to contact with airborne paints or clear coating materials, which protective coating composition comprises the ionomer of a copolymer of an alpha-olefin having between about 30 and about 1000 carbons, more preferably between about 30 and about 500 carbons, and most preferably between about 100 and 200, and acrylic acid.

In a further aspect of the invention, there is provided a process for protecting surfaces from contact with airborne paints which comprises a step of applying an aqueous dispersion of an ionomer of a copolymer of an acrylic acid and a alpha-olefin.

These and other aspects of the present invention will become more apparent by reference to the accompanying detailed description and the examples noted herein.

DETAILED DESCRIPTION OF THE INVENTION

In accordance with the present invention, there is provided a washable protective coating composition for application to surfaces which are to be subject to contact with paints, i.e., sprayed paints or airborne paints as well as clear finishing materials conventionally used to provide a sealing coat or topcoat to paints, and the like, which comprises an ionomer of the copolymer of an acrylic acid and an alpha-olefin. The washable protective coating composition is applied to the surfaces by first forming a aqueous dispersion of the ionomer of the copolymer and subsequently applying it to the surfaces to be protected. The aqueous dispersion comprising the ionomer of the copolymer may be applied on the surfaces by any means including spraying, rolling, brushing or dip coating. The washable protective coating composition may be readily removed by spraying the coating composition with pressurized water at an elevated temperature, preferably about 50 C or greater, optionally accompanied by mild scrubbing. Once the surfaces upon which the inventive coating composition has been applied have been allowed to dry, they may be recoated with the coating composition.

In accordance with the instant invention, there is provided a washable protective coating composition which comprises an ionomer of the copolymer of acrylic acid and an alpha-olefin.

The ionic copolymer can be a random ionic copolymer of an α-olefin of the formula $RCH=CH_2$ wherein R is hydrogen or alkyl radicals having from 1 to 8 carbon atoms and an $\alpha,\beta$-ethylenically unsaturated carboxylic acid having from 3 to 8 carbon atoms. The ionic copolymer has at least 10 percent of the carboxyl acid groups neutralized with metal ions. Random ionic copolymers which can be used in the composition of the present invention include those which are described in U.S. Pat. No. 3,264,272, which is incorporated herein by reference.

The cations of metals which are suitable in forming the ionic copolymers which can be used in the present invention can include monovalent, divalent and trivalent ions of metals and those elements of Groups I, II, III, IV-A and VIII of the Periodic Table of the Elements. By way of example, suitable monovalent cations include cations of sodium, potassium, lithium, cesium, silver, mercury, and copper; suitable divalent cations include the cations of beryllium, magnesium, calcium, strontium, barium, copper, cadmium, mercury, tin, lead, iron, cobalt, nickel, and zinc; suitable trivant cations include the cations of aluminum, scandium, and iron. For the composition of the present invention, the most preferred metal cation used to form the ionic copolymer is the cation of sodium.

The degree of neturalization of the ionic copolymer by the metal cations should be at least 10 percent of the carboxylic acid groups. It is generally desirable to neturalize at least 50 percent of the acid groups. Preferably, the degree of neutralization is between 60 and 100 percent; most preferably between about 70 and 100 percent. The degree of neutralization may be measured by several techniques known in the art, including infrared analysis or titration. These techniques as well as other suitable techniques are disclosed in "Ionic Copolymers" by L. Holliday, published by John Wiley & Sons, New York (1975) at pp. 74-75.

Copolymers which can be used to form the ionic copolymers of the present invention are preferably copolymers of an $\alpha,\beta$-ethylenically unsaturated carboxylic acid. Such an $\alpha,\beta$-ethylenically unsaturated carboxylic acids which may be polymerized with the ethylene include acrylic acid, methacrylic acid, itaconic acid and ethacrylic acid. Further, the ionic copolymers may be of the type described and used in U.S. Pat. No. 4,174,358 which is incorporated herein by reference. Of these, the most preferred copolymer used to form the ionic copolymer is an acrylic acid/ethylene copolymer.

Copolymers which may be used to form the protective coating compositions may be one or more of the copolymers generally described above.

The ionomers according to the instant invention are formed into aqueous dispersions. To form such dispersions, a quantity of one or more of the ionomers noted above is provided to water at a temperature of in excess of 50° C., more preferably, between 60° and 100° C., most preferably between about 60° C. and 70° C. with constant stirring so it will dissolve ionomer or ionomers used. Stirring continues until the ionomers are dissolved. Ultimately, the ionomers are provided to comprise between about 5 and 50 percent, preferably, between about 5 and 25 percent, most preferably, between about 10 and about 20 percent of the total weight of the aqueous dispersion.

The ultimate viscosity and consistency of the compositions may be varied so to improve the ease with which the emulsions may be applied to surfaces.

One method by which the viscosity of the final emulsion may be varied or adjusted is through the addition or greater, or lesser amounts of the ionomer.

A further method by which the viscosity of the final emulsion may be varied is by the inclusion of conventional thickening agents which may be added in controlled amounts in order to provide a final viscosity suited for a particular application. The amounts of conventional thickening agents needed to be added to a particular emulsion composition may be readily determined by experimentation by those skilled in the art. Examples of such conventional thickening agents include but are not limited to: hydroxy ethyl cellulose, alkali-swellable emulsions and thickeners, and hydrophobic modified ethoxylated ureathanes.

The ultimate viscosity and consistency of the compositions may be varied by either one or the other of the two methods noted immediately above, or in the alternative, both the use of additional amount of ionomer and the addition of amounts of conventional thickening agents may be simultaneously employed. The use of either of these methods, or the simultaneous use of these methods have not been found to detract from the utility of the emulsion compositions.

The aqueous dispersions comprising the ionomers may then applied to clean surfaces which are to be protected. The application of the aqueous dispersion may be in accordance with any available means which finds use. Suitable means by way of example include by spraying the aqueous dispersion, rolling the aqueous dispersion, by brushing the aqueous dispersion, or by coating an object with dipping it within the aqueous dispersion. The aqueous dispersion should be applied in a quantity so to ultimately provide between a thickness of up to about 5 mils, preferably, between about 0.1 and about 5 mils, most preferably, between about 1 and 2 mils upon the surface being provided with the coating. Subsequently, the aqueous dispersion is allowed to dry. The drying period will be understood by those skilled in the art to be wholly dependent upon the conditions, i.e., temperature, relative humidity, the presence or absence of an ventilation of air movement. Typically, during time range from up to approximately one hour under standard conditions (approximately 20° C., relative humidity of approximately 50%).

The washable protective coating composition has been noted to be resistant to common organic materials which are comprised within spray painting compositions including but not limited to aliphatic solvents, aromatic solvents, ketones and alcohols, acetone, propane, heptane, methyl-ethyl-ketone, n-butyl acetate, para-methyl acetate, IPA, xylene, toluene, methyl-isopropyl-ketone, and butyl alcohol.

The washable protective coating composition may be removed from surfaces upon which it has been applied by washing the surfaces with a pressurized stream of water, with or without the accompaniment of manual removal means such as scrubbing as with a brush or scrubbing pad, wiping down as with a textile cloth or paper sheet, or the like. Preferably, a water stream at a temperature in excess of about 50° C., or preferably higher temperatures, is used to wash the surfaces which have been coated with the composition in accordance to the instant invention. The surfaces when allowed to dry may be readily recoated with the protective coating composition and thus once again enjoy the benefits of the instant invention.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

Examples 1-6

A plurality of washable coating compositions in accordance of the present invention were produced, the compositions of the respective Examples 1 through 6 are denoted on Table 1, below. It is to be understood that the quantities of the respective constituents for each of the Examples is a "part of weight", and that each of the respective Examples 1 through 6 forms a composition having "100 parts by weight." Any deviations from this convention will be clearly noted.

The following constituents were used.

AClyn ® 266 may be described as being approximately a 100% sodium neutralized ionomer of the copolymer of ethylene and acrylic acid. It is further described as having a molecular weight in the range of between about 1500 to about 3000.

AClyn ® 286 may be described as being the sodium ionomer of ethylene and acrylic acid copolymer which is about 90% neutralized with sodium. It is further described as having a molecular weight in the range of about 1500 to about 3000.

ACX 335 may be described as being the sodium ionomer of the copolymer of ethylene and acrylic acid, approximately 70% netralized with sodium. It is further described as having a molecular weight of between about 1500 to about 3000.

TABLE 1

| Ex: | 1 | 2 | 3 | 4 | 5 | 6 |
|---|---|---|---|---|---|---|
| AClyn ® 266 | 5 | 10 | — | — | — | — |
| AClyn ® 286 | — | — | 10 | 15 | — | — |
| ACX 335 | — | — | — | — | 15 | 21 |
| water | 95 | 90 | 90 | 85 | 85 | 79 |

Each of the compositions according to Examples 1-6 were formed generally in accordance with the following procedure: in an open mixing vessel, to the parts water indicated at a temperature of 65 deg.C., the respective parts by weight of AClyn ® or the ACX material was provided with constant stirring, which stirring continued until the AClyn ® or the ACX material was substantially dispersed. The composition was then immediately cooled to room temperature (approx. 20 deg.C.) via a cooling bath.

Examples 7-11

Further washable coating compositions in accordance of the present invention were produced which further included a thickening agent; these compositions are denoted on Table 2, below. In addition to the constituents already described above, the following further constituents were used.

Acrysol TT 615 is an alkali swellable thickener presently commercially available from the Rohm & Haas Co. In Examples 7 and 11, the Acrysol TT 615 was first diluted with water in the ratio of 1 part Acrysol TT 615 to one part water to form a 50% concentration.

QR-708 is a modified ethoxylated ureathane which is presently commercially available from the Rohm & Haas Co.

Natrasol Plus is a hydroxy ethyl cellulose thickening agent which is presently commercially available from the Aqualon Co. In Example 9, the Natrasol Plus was first diluted with water in the ratio of 3 parts Natrasol Plus to 97 parts water to form a 3% concentration.

A conventional anti-foaming agent, Drewplus L-475 was also utilized in minor proportions in each of the compositions, although it is to be understood that it forms an optional constituent.

TABLE 2

| Ex: | 7 | 8 | 9 | 10 | 11 |
|---|---|---|---|---|---|
| Acyln ® 286 (10%) | 100 | 100 | 100 | 100 | 100 |
| Acrysol TT 615 | 3.2 | — | — | — | 2.2 |
| QR-708 | — | 3.6 | — | — | — |
| Natrasol Plus | — | — | 30 | — | — |
| Drewplus L-475 | 0.1 | 0.3 | 0.3 | 0.2 | 0.2 |

The compositions of Table 2 were each produced in the following manner: a 10% Aclyn ® 286 solution was produced at a temperature of 65 deg.C. in accordance with the general manner outlined in conjunction with Example 3, to which was subsequently added the respective additional constituents by stirring until all the constituents in the compositions were well dispersed. The composition was then immediately cooled to room temperature (approx. 20 deg.C.) via a cooling bath.

The emulsions of Examples 1-11 were tested to determine the effects of application of the coating to both flat and complex surfaces, and the relative ease with which paint was removable.

Various compositions of Tables 1 and 2 were dip coated onto clean flat steel panels to provide a coating thickness upon the panels of from about 0.25 mils to about 1.0 mils after allowing the panels to dry at ambient conditions (air temp. approx. 20 deg.C.). The coated panels were subsequently coated with conventional commercially available spray paints each of which contained one or more of the solvents described above. Between 1 to 3 coats of paint, averaging in thickness from about 1 to 1.5 mils were applied to the panels, each time allowing for the drying of the paint on the coated panel prior to the application of a subsequent layer of paint. A test panel which was not coated with the compositions of the present invention was also prepared as an evaluative control sample. At the conclusion of painting, the panels were allowed to dry for varying periods, from several hours to two days at ambient temperature conditions. Afterwards, the panels were cleaned by spraying them with water, i.e. from conventional laboratory sink faucet at, varying pressures. It was observed that at lower temperatures (about 15–50 deg.C.), the paint and coatings were easily removable from the panels when accompanied by mild scrubbing. This was particularly evident with the compositions of Examples which contained AClyn ® 286. It was further observed that at higher water temperatures (about 75–90 deg.C.) and increased water velocity from the laboratory sink faucet, the paint and coatings fell away from the panel under the influence of the water itself and were easily removable. No scrubbing was required. Attempts to clean the sprayed paint from the test panel were unsuccessful even with high water temperatures and velocities, and with simultaneous vigorous scrubbing.

To evaluate the efficacy of applying the inventive compositions by spray coating a clean surface, compositions comprising AClyn ® 286 were produced in accordance with Examples 3,4 and 7–11 were applied to uncoated steel panels by spray coating the compositions with an aerosol sprayer to provide a film thickness of approximately 1–2 mils. The coated panels were allowed to dry for approximately 45 minutes and afterwards the coated panels were subsequently coated with conventional commercially available spray paints each of which contained one or more of the solvents described above. Upon each of the panels, 1 to 3 coats of paint, averaging in thickness from about 1 to 1.5 mils were applied allowing for the drying of the paint on the coated panel prior to the application of a subsequent layer of paint. A test panel which was not coated with the compositions of the present invention was also prepared as an evaluative control sample. At the conclusion of painting, the panels were allowed to dry for varying periods, from several hours to two days at ambient temperature conditions. Afterwards, the panels were cleaned by spraying them with water, i.e. from conventional laboratory sink faucet at, at varying pressures. It was again observed that at lower temperatures (about 15–50 deg.C.), the paint and coatings were easily removable from the panels when accompanied by mild scrubbing. It was again further observed that at higher water temperatures (about 75–90 deg.C.) and increased water velocity from the laboratory sink faucet, the paint and coatings fell away from the panel under the influence of the water itself and were easily removable. No scrubbing was required. Attempts to clean the sprayed paint from the test panel were unsuccessful even with high water temperatures and velocities, and with the accompaniment of vigorous scrubbing.

To evaluate the efficacy of the compositions to protect irregular or complex surfaces, compositions according to Examples 3, 7 and 11 were sprayed with an aerosol sprayer to provide a coating of between about 1–2 mils thickness when dried onto the metal grating of the step of a step ladder, and allowed to dry. A conventional spray paint was then sprayed onto the coated metal grating as well as on an adjacent metal grating which was not provided with a coating of the inventive composition and allowed to stand for approximately 16 hours so to ensure that the paint was dry. A low pressure, cold water stream (approximately 5–8 deg.C.) was then directed at the coated metal grating and with the accompaniment of moderate scrubbing with a cellulose sponge, the paint and coating composition was removable. In contrast, the paint spray upon the adjacent, uncoated metal grating was not removable under the same cleaning conditions.

I claim:

1. A protective coating composition consisting essentially of:
   (a) about 50 to 95% water; and
   (b) about 50 to 5% of a random ionic copolymer consisting of monomeric repeating units derived from the following:
      i) an α-olefin of the formula $RCH=CH_2$, wherein R is selected from the group consisting of hydrogen and alkyl radicals having from 1–8 carbon atoms; and
      ii) an α,β-ethylenically unsaturated carboxylic acid selected from the group consisting of acrylic acid, methacrylic acid, itaconic acid and ethacrylic acid, wherein at least 50% of the carboxylic acid groups in said α,β-ethylenically unsaturated carboxylic acid are neutralized with metal ions; and,
   wherein following application of paint over said composition, said composition may be removed from a surface by washing with water.

2. A protective coating composition consisting essentially of:
   (a) about 50 to 95% water; and
   (b) about 50 to 5% of a random ionic copolymer consisting of ethylene and acrylic acid repeating units, wherein at least 50% of the carboxylic acid groups in said acrylic acid repeating unit are neutralized with sodium ions; and,
   wherein following application of paint over said composition, said composition may be removed by washing with water.

3. A composition according to claim 2, wherein at least about 70% of the carboxyl groups in said acrylic acid repeating unit are neutralized with sodium ions.

4. A composition according to claim 2, wherein about 90% of the carboxyl groups in said acrylic acid repeating unit are neutralized with sodium ions.

5. A composition according to claim 1, which consists essentially of about 5–25% of said copolymer, and about 95–75% water.

6. A composition according to claim 1, which consists essentially of about 10–20% of said copolymer, and about 90–80% water.

7. An aqueous dispersion consisting essentially of:
   (a) water; and
   (b) a coating effective amount of a random ionic copolymer consisting of monomeric repeating units derived from the following:
      i) an α-olefin of the formula $RCH=CH_2$, wherein R is selected from the group consisting of hydrogen and alkyl radicals having from 1–8 carbon atoms; and
      ii) an α,β-ethylenically unsaturated carboxylic acid selected from the group consisting of acrylic acid, methacrylic acid, itaconic acid and ethacrylic acid, wherein at least 50% of the carboxylic acid groups in said α,β‑ethylenically unsaturated carboxylic acid are neutralized with metal ions, and, wherein following application of paint over said dispersion, said dispersion is removable by washing with water.

8. The composition according to claim 1, wherein the ionomers have more than 65 percent of the carboxyl acid groups neutralized with metal ions.

9. The composition according to claim 1, wherein the metal ion is one or more metal ions selected from the group consisting of monovalent, divalent and trivalent ions of metals and elements of Groups I, II, III, IV-A and VIII of the Periodic Table of the Elements.

10. The composition according to claim 1, wherein the metal ion is a monovalent cation selected from the group consisting of: sodium, potassium, lithium, cesium, silver, mercury, and copper.

11. The composition according to claim 1, wherein the metal ion is a bivalent cation selected from the group consisting of: beryllium, magnesium, calcium, strontium, barium, copper, cadmium, mercury, tin, lead, iron, cobalt, nickel and zinc.

12. The composition according to claim 1, wherein the metal ion is a trivalent cation selected from the group consisting of: aluminum, scandium and iron.

13. The composition according to claim 1, wherein further comprises a thickening agent.

14. The composition according to claim 1, which further comprises an anti-foaming agent.

* * * * *